April 26, 1966    J. E. KIENLE    3,248,067
SERVO MOTOR CONTROL SYSTEM FOR MAGNETIC TAPE UNIT
Filed April 18, 1962
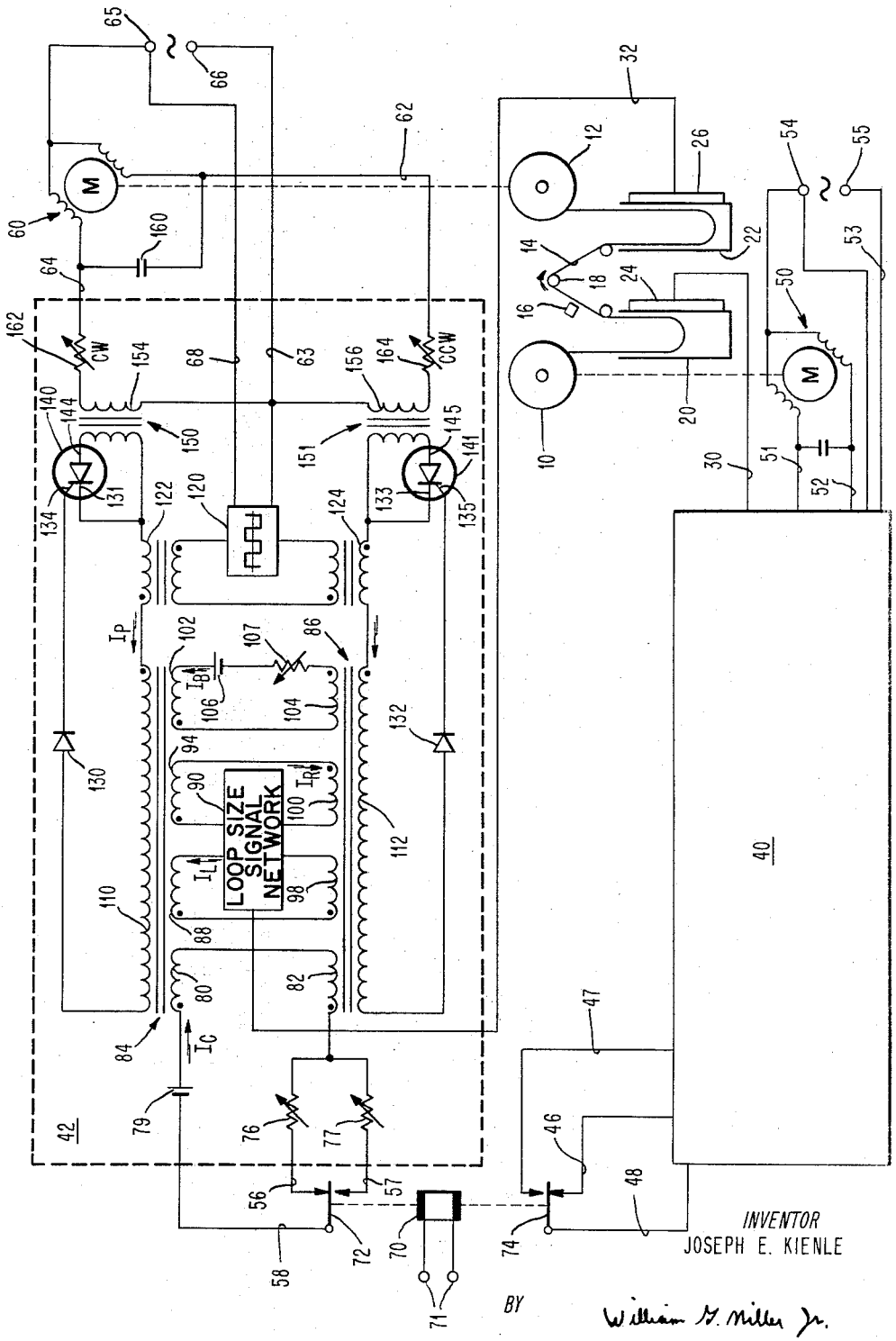
INVENTOR
JOSEPH E. KIENLE
BY William G. Miller Jr.
AGENT United States Patent Office 3,248,067
Patented Apr. 26, 1966

3,248,067
SERVO MOTOR CONTROL SYSTEM FOR MAGNETIC TAPE UNIT
Joseph E. Kienle, Flourtown, Pa., assignor to Sperry Rand Corporation, New York, N.Y., a corporation of Delaware
Filed Apr. 18, 1962, Ser. No. 188,442
5 Claims. (Cl. 242—55.12)

This invention relates to control systems and more specifically to control systems for controlling the torque of a motor for driving a reel, such as a reel of magnetic tape, in a manner to maintain a desired length of tape between a capstan drive and the reel itself to thereby accommodate different rates of acceleration as between the capstan and the reel.

In the past there have been a number of control circuits utilized to accomplish reel motor control in systems of this type, however, these controls have generally included vacuum tubes and other devices which are more subject to failure than solid state elements.

It is, therefore, an object of this invention to provide an improved reel motor control.

More specifically, it is an object of this invention to provide a reel motor control system utilizing only solid state elements.

A further object of this invention is the provision of a reel motor control having an extended range over which the control function can be effected.

A still further object of this invention is the provision of a simpler and more dependable control for tape reel motors.

A still further object of this invention is the provision for extending the range of firing angle over which a silicon controlled rectifier can be fired by a magnetic amplifier circuit to obtain an extended range of control.

This and other objects of the invention will be more apparent from the following description and the drawing, in which the figure is a schematic diagram of a control circuit which forms a preferred embodiment of this invention.

In carrying out the above objects there is provided a magnetic amplifier having a core, a first control winding with means for producing a current flow therein which is of magnitude related to the actual length of the tape loop in the loop box between the capstan and the reel. The magnetic amplifier also includes a second control winding with means for producing therein a current flow of magnitude which is related to the desired length of the loop. Additionally, the magnetic amplifier includes a power winding. Coupled to this power winding is a means for producing a potential which is essentially a square wave and which tends to produce current in the power winding to drive the core into saturation in one direction during a certain portion of the square wave. The first and second core windings are connected to have opposite effects on the core and a bias winding is added to carry a fixed current tending to drive the core in a direction opposite that of the current in the power winding. Also, the currents in the control windings and the bias winding are such that the core is in its saturated region in the said one direction during a portion of each cycle of the square wave if the magnetomotive force produced by the first and second control windings differ in a sense to produce a net magnetomotive force aiding that produced by the power winding. The portion of the cycle during which the core is in the saturated region will consequently have a duration directly related to the deviation of the loop length from its desired value. A silicon controlled rectifier coupled in circuit with the magnetic amplifier is fired to its conductive state whenever the core of the magnetic amplifier is in its saturated region. This silicon controlled rectifier has its cathode and anode connected across one winding of a transformer with the other winding of the transformer being serially connected in a power circuit to the motor to be controlled so that the impedance in the power circuit is low only during that portion of each period when the magnetic amplifier is in its saturated region. Variations in the duration of this portion thus effectively vary the torque of the motor.

In the figure, the tape recorder unit is shown as consisting of a supply reel 10 and a take-up reel 12 which form a part of the transport mechanism for moving the tape 14 over the magnetic transducer head unit 16.

The rate of speed at which the tape 14 is moved past the transducer head 16 is determined by capstan 18 which because of its light weight is capable of more rapid acceleration than are the reels 10 and 12. In the forward direction the capstan 18 moves in the direction shown by the arrow and in so doing pulls tape past transducer head 16. The result of such tape movement causes the tape 14 to be drawn from vacuum loop box 20 and to be spilled into vacuum loop box 22 which are respectively interposed between the capstan 18 and the reels 10 and 12 to provide storage loops of tape which are capable of accommodating the different acceleration rates of the capstan 18 as compared to the reels 10 and 12.

As the tape is drawn out of loop box 20 and spilled into loop box 22 loop length detection elements 24 and 26, which are respectively coupled to loop boxes 20 and 22, detect the change in the length of tape in those boxes and provide signals over lines 30 and 32 which are each indicative of the length of tape actually in the respective loop box.

These loop length detecting devices 24 and 26 may be constructed in any of a number of ways well known in the art and they may, for example, be of the type shown and described in U.S. patent application Serial Number 151,375, of Robert S. Wooldrige, Jr., a co-worker of applicant, now Patent No. 3,137,453.

The signals indicating the actual loop length in the loop boxes on lines 30 and 32 are fed to the controllers 40 and 42 respectively. The controller 40 receives input signals from lines 46 or 47 and line 48 as well as from line 30 and produces, as a result of the controlling function it performs, a change in the torque of motor 50 by controlling the current flow in the lines 51, 52 and 53 which connect the motor 50 to a source of A.C. supply voltage at terminals 54 and 55.

Likewise, controller 42 receives input signals from lines 56 or 57 as well as line 58 and line 32 and as a result of the control functions it performs establishes the desired torque in motor 60 by controlling the current flow in lines 62, 63 and 64 from the A.C. source connected to terminals 65 and 66 which source may correspond to that connected to terminals 54 and 55.

Since the controllers 40 and 42 are identical in their circuits and operation only the operation of the circuit of controller 42 will be explained in detail.

As is well known, tape drive systems which include vacuum loop boxes between the driving capstan and each of the reels can have the capacity of their tape loop boxes utilized to an optimum degree only when the length of loop in each of the loop boxes is controlled in dependence upon the direction in which the tape is moving, if it is in motion, or in accordance with the direction in which it is about to move, if it is stationary. For example, if we assume that the capstan 18 is rotating in a clockwise direction as shown by the arrow to move tape forward across the transducer head 16 the optimum loop lengths for the loop boxes 20 and 22 would include the shortest possible length in loop box 20 and the longest possible length in loop box 22. This is desirable in view of the tendency of the reels 10 and 12 to continue to rotate after the capstan 18 has stopped. This continued rotation draws tape out of loop box 22 and puts tape into loop box 20. Thus, by so predetermining the length of loop in each of the loop boxes as above described this tendency for the reels 10 and 12 to continue to rotate can be accommodated and the tape will not spill out or be pulled out of the loop boxes.

The optimum lengths in the loop boxes 20 and 22 will be the same for the condition in which the tape is stationary and a backward rotation of the capstan 18 is anticipated. The opposite arrangement of loop lengths; namely, a long length in loop box 20 and a short length in loop box 22, would be desirable for the condition where the next motion of a stationary tape is to be in a forward direction or for the condition in which the capstan 18 is moving in a backward direction. These two possible orientations of the loops in the boxes are controlled by relay coil 70 which receives appropriate signals at the input terminals 71.

Assuming that the capstan 18 is either running in a backward direction or is preparing to run in a forward direction the relay coil 70 would be de-energized and the movable contacts of relay 70; namely, contacts 72 and 74, would be in the position shown in the figure thus connecting line 58 with line 56 and line 48 with line 46.

Variable resistors 76 and 77 are adjustable to determine the length of the loop in loop box 22 for its longest and its shortest lengths, respectively. Thus, with the movable relay 72 connecting lines 58 and 56 current from battery 79 will flow through control windings 80 and 82 and the magnitude of this current will depend upon the setting of variable resistor 76.

The control windings 80 and 82 are part of magnetic amplifiers 84 and 86, respectively. Magnetic amplifier 84 includes in addition to control winding 80, which carries a current $I_C$ indicative of the desired size of the loop in box 22, a control winding 88, which carries a current $I_L$ indicative of the actual loop size in loop box 22 as detected by detector 26. The current $I_L$ in winding 88 is generated by a loop size signal network shown as block 90. This network may be any of a number of configurations such as will generate a current in winding 88 in dependence upon the signal presented on line 32 from the detector 26 indicative of the actual loop size in loop box 22. In addition, the loop size signal network 90 is of a type to generate a current $I_R$ in winding 94, another control winding on magnetic amplifier 84, which current is related to the rate of change of the loop length in loop box 22.

As is evident from the figure, the current in control winding 88 also flows through control winding 98 of magnetic amplifier 86 and the current in control winding 94 also flows in control winding 100 of magnetic amplifier 86.

In addition to these control windings each of the magnetic amplifiers 84 and 86 has a bias winding with a constant current $I_B$ flowing through it. These bias windings are shown as winding 102 in magnetic amplifier 84 and winding 104 in magnetic amplifier 86. This constant current is produced by battery 106 in series with variable dropping resistor 107 and provides a bias for the square loop cores of the magnetic amplifiers 84 and 86 which bias is so adjusted in magnitude by varying resistor 107 that it tends to maintain those cores in a reset condition.

Magnetic amplifiers 84 and 86 also have power windings 110 and 112, respectively. A square wave source 120, which may be a circuit utilizing a double anode zener diode to clip both positive and negative portions of the A.C. source supplied at terminals 65 and 66, is effective through transformers 122 and 124 to produce current $I_P$ in power winding 110 during one-half cycle of the square wave and a similar current in power winding 112 during the other one-half cycle in accordance with the polarization of the series connected diodes 130 and 132. This square wave is adjusted to correspond in phase to the A.C. power supplied to motors 50 and 60. To effect this synchronization source 120 preferably receives power from terminals 65 and 66 by way of lines 68 and 63. All of the windings on the cores of magnetic amplifiers 84 and 86 have winding sense as indicated by the well known "dot" convention.

The series circuits including the transformed outputs of the square loop source, the power windings and the associated diodes are respectively coupled between the cathodes 132 and 133 and the associated gate electrodes 134 and 135 of the respective silicon control rectifiers 140 and 141. The silicon controlled rectifiers 140 and 141 have their anodes 144 and 145 respectively connected in circuit with a winding of each of the transformers 150 and 151 and their respective cathodes 131 and 133.

Considering the operation of the magnetic amplifier 84 and silicon controlled rectifier 140 in conjunction with transformer 150 it will be evident that the power winding 110 acts like a high impedance to current flow to gate electrode 134 except during those periods when the magnetic amplifier 84 is in saturation and during those periods the current flowing to the gate electrode 134 causes the silicon controlled rectifier 140 to exhibit a low impedance between its anode 144 and its cathode 131. This low impedance is reflected into other windings of transformer 150 such as winding 154.

The circuit including the power winding 112 of magnetic amplifier 86 and silicon controlled rectifier 141 in conjunction with transformer 151 performs a like control on the impedance reflected into the winding 156 during the half cycle of the square wave source 120 on which power winding 110 is ineffective due to diode 130.

The windings 154 and 156 of transformers 150 and 151 are respectively in the clockwise and counterclockwise circuits of motor 60, thus a high impedance reflected in the winding 154 coupled with a low impedance reflected in the winding 156 would be effective to provide a torque in a counterclockwise direction from motor 60 to move reel 12 in a counterclockwise direction. Conversely, a low impedance reflected into winding 154 and a high impedance reflected into winding 156 is effective to provide a clockwise torque to move reel 60 in a clockwise direction. The power for the motor 60 is provided by an A.C. source coupled to terminals 65 and 66 and the desired phasing of the current through its respective windings is accomplished by capacitor 160. The motor control circuit also includes variable resistors 162 and 164 which are respectively adjustable to obtain the desired current flows in the motor windings for the clockwise and counterclockwise rotation, respectively.

It is thus evident that the portion of the cycle of the power source connected to terminals 65 and 66 in which the terminal 65 is positive, for example, desirably coincides with the period during which the square wave source 120 induces a voltage in the secondary of transformer 122 tending to provide a forward current through diode 130. The magnitude of this current will be controlled as set forth above by the effective impedance of the power winding 110 of magnetic amplifier 84 and this impedance is a function of whether or not the square loop core of the magnetic amplifier 84 is in saturation or not.

Whether or not the magnetic amplifier core goes into saturation and the duration of the period during which it is saturated is controlled by the magnitude of magnetomotive forces produced in the core of the magnetic amplifier by the currents in the associated bias winding and the control windings as well as that produced by the power winding.

For operation in the desired manner the magnetomotive forces due to control windings 80 and 88, for example, should oppose each other and preferably cancel each other when the tape loop is at its desired length. Under that condition the constant bias introduced by winding 102 tends to maintain the core at a point on the hysteresis loop which will prevent current in the power winding from saturating the core. The current in the power winding is, of course, produced by the square wave source and under these conditions causes the core to traverse only the unsaturated region of its hysteresis loop when the tape loop is at its desired length. The silicon controlled rectifier 140 is then not fired at all during any portion of the square wave. The control windings such as 80 and 88 are so poled that a deviation of the tape loop length from its desired value causes the silicon controlled rectifier, such as 140, to reflect an impedance into winding 154 which will be low during a portion of the square wave if clockwise rotation of the motor 60 can correct the deviation, otherwise it will not go low. The duration of the period of the square wave during which the impedance of the power winding is low or in other words the firing angle of the silicon controlled rectifier is a function of the magnitude of the deviation of the actual loop length from the desired loop length or in other words the difference between the magnetomotive forces due to control windings 80 and 88. As the firing angle of the silicon controlled rectifier is increased the torque of the motor 60 increases since power is allowed to flow through transformer winding 154 for a greater portion of each cycle.

It has been found that by utilizing a square wave source to energize the power windings it is possible to obtain firing angles for the associated silicon controlled rectifiers which cover almost the complete range of possible firing angles which would be from 0° to 180°. This is possible since the volt-seconds applied at each point in time during a square wave are greater than would be the case with a sine wave. Thus, the core of the magnetic amplifier reaches saturation faster and therefore a more extended range of control is possible than would be the case if a sine wave source were used. As a result, the firing angle is more precisely controlled.

While the use of the diodes 130 and 132 allows current from the square wave source 120 (including transformer 122) to maintain the gate electrode 134 with forward current and hence a low impedance in rectifier 140 only during a maximum of 180° of its cycle the current between the cathode 131 and the anode 144 of silicon controlled rectifier 140, for example, cannot be stopped instantly due to the stored energy in the inductance of the transformer windings and thus when the A.C. source coupled to the motor at terminals 65 and 66 reverses current continues to flow in the motor 60 during at least a part of the next half cycle. In fact when the firing angle approaches 180° current continues to flow during a large part of the next half cycle thus allowing a maximum torque to be delivered by the motor.

Having described one embodiment it is believed obvious that modifications may be made without changing the essential mode of operation. Such modifications are intended to be within the scope of the appended claims.

The embodiments of the invention in which an exclusive property or privilege is claimed are defined as follows:

1. In a tape recording unit of the type having a capstan for moving tape from one storage loop past a transducer head into another storage loop, separate motor operated reels each individually rotatable to maintain the desired length of tape in an associated one of said storage loops and means for controlling each of said reel motors, the combination of:
   (a) individual first signal means operative to produce a first signal representative of the desired length of tape in each of said storage loops,
   (b) individual second signal means operative to produce a second signal representative of the actual length of tape in each of the storage loops and a third signal representative of the rate of change of the actual length of tape in each of the storage loops,
   (c) a source of fixed bias,
   (d) separate power circuits for supplying power for moving each of said reel motors in the forward and backward directions,
   (e) a transformer for each of said power circuits, said transformers each having one winding serially connected in a corresponding power circuit so that the impedance reflected into that winding allows a flow of sufficient power to the associated motor to cause it to rotate when said reflected impedance is below a certain value,
   (f) a separate silicon controlled rectifier associated with each of said transformers, the cathode and anode of each of said rectifiers being coupled to opposite ends of another winding of each of said transformers so that said other winding reflects to said one winding an impedance below said certain value in the corresponding power circuit only when the associated silicon controlled rectifier is in a conducting state,
   (g) a separate control circuit connected between the cathode and gate electrode of each of said silicon controlled rectifiers for controlling the firing of said silicon controlled rectifiers,
   (h) a separate magnetic amplifier for controlling each direction of rotation of each of said reel motors, each of said magnetic amplifiers having first, second and third control windings, a bias winding and a power winding on a square loop core,
   (i) each of said control circuits including in serial connection a source of square wave power, a diode poled to allow only forward current to said gate electrode, and a power winding of one of said magnetic amplifiers,
   (j) means connecting said first, second, and third control windings respectively to receive said first, second, and third signals and said bias winding to receive said fixed bias so that said power windings each act as a low impedance to allow the associated silicon controlled rectifier to become conductive during that portion of the square wave passed by said diode when said control signals produce a net effect on the magnetization of said core which is in direction to aid the effect on said core of said square wave power through said power windings with the duration of the conductive portion depending on the magnitude of said net effect which represent the deviation of the sum of said second and third signals from the value of said first signal, whereby the associated reel motor is energized to rotate in a direction and at a speed tending to restore the storage loop to its desired length as represented by said first signal.

2. A control system for controlling the torque of a tape reel drive motor in a certain direction to maintain a desired length of tape in an adjacent loop box comprising
   (a) a magnetic amplifier having a core,
   (b) a first control winding on said core,
   (c) means for producing a current flow in said first control winding of magnitude related to the actual length of the tape loop in said loop box,
   (d) a second control winding on said core,
   (e) means for producing in said second control winding a current flow of magnitude related to the desired length of said loop,
   (f) a power winding on said core,
   (g) means for producing a potential having a square wave shape, said potential producing means connected to produce current in said power winding to drive said core into saturation in one direction during a certain portion of each cycle of said square wave,
   (h) said first and second control windings being connected to have opposite effects on said core,
   (i) bias winding means carrying a fixed current tending to drive said core in a direction opposite said one direction, (j) said currents in said control windings and said bias winding being such that said core is driven to its saturated region by current in said power winding during a portion of each cycle of said square wave when the currents in said first and second control windings differ in a certain sense, (k) said portion of each cycle having a duration directly related to the deviation of said loop from its desired size, and said sense representing a sense of said deviation which is correctable by said motor rotating its reel in said certain direction, (l) a silicon controlled rectifier coupled in circuit with said magnetic amplifier so that it fires when said core is in its saturated region, (m) a transformer having one winding connected between the cathode and anode of said silicon controlled rectifier and another winding serially connected in the power circuit of said motor, (n) whereby said power circuit produces a torque from said motor in said certain direction of magnitude related to the portion of time said core is in its saturated condition.

3. A control system for controlling the torque and direction of rotation of a tape reel drive motor to maintain a desired length of tape in an adjacent loop box comprising:

(a) a power circuit for said motor, said power circuit having a first path carrying power for rotation in one direction and a second path carrying power for rotation in an opposite direction;

(b) a transformer for each path;

(c) one winding of each of said transformers being connected serially in its associated path so that variations in the effective impedance on said one winding of each transformer effectively regulates the torque of said motor in one direction;

(d) another winding on each of said transformers;

(e) a silicon controlled rectifier for each transformer, each of said silicon controlled rectifiers having a cathode and anode connected to opposite ends of its said other winding;

(f) a first and second control circuit for controlling the firing angle of the corresponding silicon controlled rectifiers, said control circuits each being coupled to respectively alter the impedance in the power circuits for clockwise and counterclockwise rotation in accordance with the sense of the deviation of the length of said tape in said loop box from the desired value necessary to correct said deviation, said control circuits each including (1) a source of potential having an amplitude following a square wave, (2) a diode polarized to utilize a portion of said square wave, (3) a magnetic amplifier having a power winding in series with said square wave source and the gate and cathode electrodes of the corresponding silicon controlled rectifier;

(g) each of said magnetic amplifiers also having (1) a first control winding connected to a source of current of magnitude related to the actual loop length in said loop box, (2) a second control winding connected to a source of current magnitude related to the desired length of said loop, (3) and a bias winding connected to a constant current source, said bias winding and said power windings being so wound that their currents cause opposing flux in the associated cores;

(h) said first and second control windings being wound on their respective cores so that their currents cause opposing fluxes with the first control winding in each control circuit having different relationships to the power windings on corresponding cores in dependence upon the direction of rotation to be effected by the associated power circuits.

4. In a tape recording unit of the type having a capstan for moving tape from one storage loop past a transducer head into another storage loop, separate motor operated reels each individually rotatable to maintain the desired length of tape in an associated one of said storage loops and means for controlling each of said reel motors, the combination of:

(a) individual first signal means operative to produce a first current representative of the desired length of tape in each of said storage loops, (b) individual second signal means operative to produce a second current representative of the actual length of tape in each of the storage loops and a third current representative of the rate of change of the actual length of tape in each of the storage loops, (c) a source of fixed bias current, (d) a power circuit for supplying power for moving each of said reel motors, (e) a transformer for said power circuit, said transformers having one winding serially connected in the power circuit so that the impedance reflected into that winding allows a flow of sufficient power to the associated motor to cause it to rotate when said reflected impedance is below a certain value, (f) a silicon controlled rectifier associated with said transformer, the cathode and anode of said rectifier being coupled to opposite ends of another winding of said transformer so that said other winding reflects to said one winding an impedance below said certain value in the power circuit only when the associated silicon controlled rectifier is in a conducting state, (g) a separate control circuit connected between the cathode and gate electrode of said silicon controlled rectifier for controlling the firing of said silicon controlled rectifier, (h) a magnetic amplifier for controlling rotation of said magnetic amplifier having first, second and third control windings, a bias winding and a power winding on a square loop core, (i) said control circuit including in serial connection a source of square wave power, a diode poled to allow only forward current to said gate electrode, and a power winding of said magnetic amplifier, (j) means connecting said first, second, and third control windings respectively to receive said first, second, and third currents and said bias winding to receive said fixed bias current so that said power winding acts as a low impedance to allow the silicon controlled rectifier to become conductive during that portion of the square wave passed by said diode when said control signals produce a net effect on the magnetization of said core which is in direction to aid the effect of said core of said square wave power through said power windings with the duration of the conductive portion depending on the magnitude of said net effect which represent the deviation of the sum of said second and third signals from the value of said first signal, whereby the reel motor is energized to rotate at a speed sufficient to restore the storage loop to its desired length as represented by said first signal.

5. A control system for controlling the torque of a tape reel drive motor in a certain direction to maintain a desired length of tape in an adjacent loop box comprising (a) a magnetic amplifier having a core, (b) a first control winding on said core, (c) means for producing a current flow in said first control winding of magnitude related to the actual length of the tape loop in said loop box, (d) a second control winding on said core, (e) means for producing in said second control winding a current flow of magnitude related to the desired length of said loop,
(f) a power winding on said core,
(g) means for producing a potential having a square wave shape, said potential producing means connected through diode means to produce a unidirectional current in said power winding during one half of the cycle of said square wave to drive said core into saturation in one direction during that half cycle of said square wave,
(h) said first and second control windings being connected their respective currents produce opposing magnetomotive forces in said core,
(i) bias winding means carrying a fixed current tending to drive said core in a direction opposite said one direction,
(j) said currents in said control windings and said bias winding being such that said core is driven to its saturated region by current in said power winding during a portion of said half cycle of said square wave when the currents in said first and second control windings differ in a certain sense,
(k) said portion of each half cycle having a duration directly related to the deviation of said loop from its desired size, and said sense representing a sense of said deviation which is correctable by said motor rotating its reel in said certain direction,
(l) a silicon controlled rectifier coupled in circuit with said magnetic amplifier so that it fires when said core is in its saturated region,
(m) a transformer having one winding connected between the cathode and anode of said silicon controlled rectifier and another winding serially connected in the power circuit of said motor,
(n) whereby said power circuit produces a torque from said motor in said certain direction of magnitude related to the portion of time said core is in its saturated condition.

References Cited by the Examiner

UNITED STATES PATENTS 2,952,415    9/1960    Gilson _____ 242—55.12
2,990,484    6/1961    Jones _____ 242—75.51 X MARVIN STEIN, *Primary Examiner.*

HARRISON R. MOSELEY, *Examiner.*

G. F. MAUTZ, *Assistant Examiner.*